(12) United States Patent
Nickel

(10) Patent No.: US 6,311,732 B1
(45) Date of Patent: Nov. 6, 2001

(54) HEAVY-DUTY WIRE-MESH CABLE TROUGH

(75) Inventor: Wilfried Nickel, Menden (DE)

(73) Assignee: Obo Bettermann GmbH & Co., KG, Menden (DE)

( * ) Notice: Subject to any disclaimer, the term of this patent is extended or adjusted under 35 U.S.C. 154(b) by 0 days.

(21) Appl. No.: 09/603,661

(22) Filed: Jun. 23, 2000

(30) Foreign Application Priority Data

Jun. 26, 1999 (DE) ............................................... 199 29 458

(51) Int. Cl.[7] ................................ F16L 55/00; F16L 3/01
(52) U.S. Cl. ........................... 138/108; 138/112; 248/49; 248/68.1; 211/181.1; 206/443; 206/446
(58) Field of Search ..................................... 138/108, 112; 206/443, 446; 248/614, 49, 89, 68.1; 211/181.1

(56) References Cited

U.S. PATENT DOCUMENTS

| | | | |
|---|---|---|---|
| 3,887,073 | * | 6/1975 | Wilson ................................. 206/507 |
| 4,064,994 | * | 12/1977 | Ondrasik, II ....................... 211/181.1 |
| 4,553,523 | * | 11/1985 | Stohrer, Jr. ........................ 211/181.1 |
| 4,597,616 | * | 7/1986 | Trubiano ........................... 211/181.1 |
| 5,423,437 | * | 6/1995 | Kayem .............................. 211/181.1 |
| 5,531,410 | * | 7/1996 | Simon .................................... 248/49 |
| 5,927,658 | * | 7/1999 | Gerster .................................. 248/49 |
| 6,138,961 | * | 10/2000 | Zweig .................................. 248/68.1 |

* cited by examiner

Primary Examiner—James Hook
(74) Attorney, Agent, or Firm—Herbert Dubno; Andrew Wilford

(57) ABSTRACT

A cable-guide trough has a set of like U-shaped cross wires aligned with one another and lying in respective generally parallel and longitudinally spaced planes so as to form a trough with a horizontal floor and two upright sides. A set of generally parallel longitudinal wires is joined to the cross wires at the floor and sides. One of the sets is formed at the floor in upper and lower layers vertically flanking the other of the sets at the floor. The wires are all of identical cross-sectional size and shape. Both sets of wires are formed as two layers in the trough floor to produce a four-layer floor. Each wire of the lower layer lies directly underneath a respective one of the wires of the upper layer. The one set can be the longitudinal wires or the cross wires in a three-layer system. Furthermore the one set can be formed in the trough sides as inner and outer layers horizontally flanking the other of the sets at the trough sides.

7 Claims, 1 Drawing Sheet

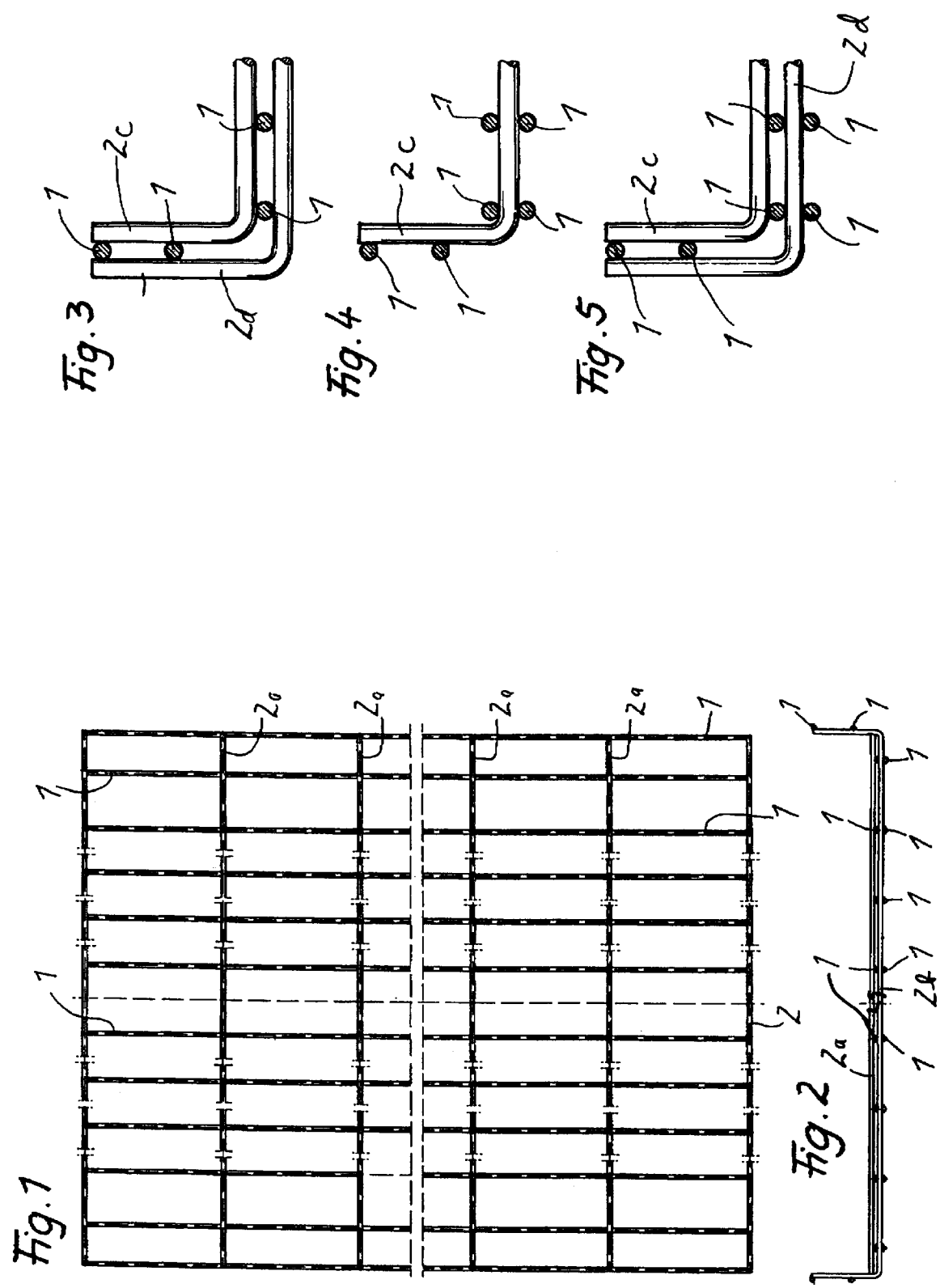

HEAVY-DUTY WIRE-MESH CABLE TROUGH

FIELD OF THE INVENTION

The present invention relates to a wire-mesh cable trough. More particularly this invention concerns such a trough intended to carry wires in a utility closet, equipment room, or the like.

BACKGROUND OF THE INVENTION

Wire-mesh troughs are typically used to hold wires and cables in such a manner that they are solidly supported yet readily accessible. Thus it is standard to provide such troughs adjacent the ceiling in computer rooms and the like.

The typical trough is made of a plurality of relatively stiff longitudinal rods and at least two crosswise U-shaped rods to which they are welded, for instance with four longitudinal rods at the base of the U-shaped cross rod and two more longitudinal rods forming sides of the trough and secured to the upwardly pointing arms of the cross rods. Of course angled troughs are provided for going around corners and changing levels and T- or X-shaped troughs are provided for forming intersections where several such troughs are joined together.

The gauge of the wire used is increased for heavy-duty troughs. Thus such a trough is made identically to a light-duty trough, but of much thicker wire. As a result such heavy-duty troughs are often inordinately heavy, as the increase in strength and stiffness is associated by a disproportionate increase in mass.

OBJECTS OF THE INVENTION

It is therefore an object of the present invention to provide an improved wire-mesh cable trough.

Another object is the provision of such an improved wire-mesh cable trough which overcomes the above-given disadvantages, that is which is quite strong so that it is suitable for heavy-duty use, but which is still relatively light.

SUMMARY OF THE INVENTION

A cable-guide trough has according to the invention a set of like U-shaped cross wires aligned with one another and lying in respective generally parallel and longitudinally spaced planes so as to form a trough with a horizontal floor and two upright sides. A set of generally parallel longitudinal wires is joined to the cross wires at the floor and sides. One of the sets is formed at the floor in upper and lower layers vertically flanking the other of the sets at the floor.

Such a system has been found to be very strong. The three-layer floor is extremely stiff. A standard heavy-duty system with a single layer of cross wires and a single layer of longitudinal wires of a diameter of 4.7 mm has a weight per unit of length of 6.9 kg. With the system of this invention using a four-layer floor and two-layer sides of wires all 3.1 mm thick the overall strength and stiffness is equal to or greater than that of the single-layer system, but the weight per unit of length is 5.5 kg.

The wires according to the invention are all of identical cross-sectional size and shape. Both sets of wires are formed as two layers in the trough floor to produce a four-layer floor.

In accordance with the invention each wire of the lower layer lies directly underneath a respective one of the wires of the upper layer. The one set can be the longitudinal wires or the cross wires in a three-layer system.

The one set is formed in the trough sides as inner and outer layers horizontally flanking the other of the sets at the trough sides.

BRIEF DESCRIPTION OF THE DRAWING

The above and other objects, features, and advantages will become more readily apparent from the following description, reference being made to the accompanying drawing in which:

FIG. 1 is a top view of a trough according to the invention;

FIG. 2 is an end view of the FIG. 1 trough; and

FIGS. 3, 4, and 5 are large scale sections through corners of further troughs in accordance with the invention.

SPECIFIC DESCRIPTION

As seen in FIGS. 1 and 2 a wire-mesh trough according to the invention is comprised of an array of identical and straight longitudinal wires or bars 1 joined together by cross wires or bars 2a and 2b of identical diameter and circular section. The wires 1 are arrayed in a U-shape, with twenty wires 1 arrayed in two layers of ten each forming a floor of the trough and two wires 1 each forming a normally upright side. The cross wires 2a and 2b are spaced longitudinally by about 100 mm and the longitudinal wires 1 are spaced transversely by about 50 mm. This trough can be made simply by laminating the subassembly comprised of a mesh of the upper layer of longitudinal wires 1 and the upper cross wires 2a to a structure comprised of the lower layer of longitudinal wires 1 and the lower or outer cross wires 2b.

The wires 2a are perfectly straight and are welded atop the upper layer of the floor wires 1. The wires 2b are of squared-off U-shape and are welded to the bottoms of the wires 1 of the upper layer and to the insides of the wires 1 forming the sides, and the lower layer of longitudinal wires 1 in the floor are welded to the bottoms of the wires 2b. The wires 1, 2a, and 2b are welded together where they intersect and the intersections of the wires 2a and the wires 1 are directly above the intersections of the wires 2b and the wires 1 so that the wires 2a lie in the same plane as the respective wires 2b. Similarly the wires 1 of the upper layer of the trough floor lie directly above the wires 1 of the lower layer of the trough floor. The floor of the trough is therefore formed of two layers or wires 1 and two layers of the wires 2a and 2b.

In FIG. 3 a trough is shown having three layers through its floor and sides. To this end inner U-shaped cross wires 2c and outer U-shaped cross wires 2d flank the longitudinal wires 1, with each wire 2c coplanar with a respective one of the wires 2d.

Another three-layer system is shown in FIG. 4 with the U-shaped cross wires 2c flanked in the trough floor by two layers of longitudinal wires 1, although only one layer of wires 1 is used in the trough sides.

In FIG. 5 a system is shown having four layers in the floor and three in the side. Thus this arrangement is identical to that of FIGS. 1 and 2 except that U-shaped inner wires 2c are used that are run up the trough sides.

I claim:

1. A cable-guide trough comprising:
   a set of like U-shaped cross wires aligned with one another and lying in respective generally parallel and longitudinally spaced planes so as to form a trough with a horizontal floor and two upright sides;

a set of generally parallel longitudinal wires engaging the set of cross wires at intersections at the floor and sides, one of the sets being formed at the floor in upper and lower layers vertically flanking the other of the sets at the floor; and welds at the intersections permanently joining the wires together at the intersections.

2. The cable-guide trough defined in claim 1 wherein the wires are all of identical cross-sectional size and shape.

3. The cable-guide trough defined in claim 1 wherein both sets of wires are formed as two layers in the trough floor.

4. The cable-guide trough defined in claim 1 wherein each wire of the lower layer lies directly underneath a respective one of the wires of the upper layer.

5. The cable-guide trough defined in claim 1 wherein the one set is the longitudinal wires.

6. The cable-guide trough defined in claim 1 wherein the one set is the cross wires.

7. The cable-guide trough defined in claim 1 wherein the one set is formed in the trough sides as inner and outer layers horizontally flanking the other of the sets at the trough sides.

* * * * *